Feb. 28, 1967  G. C. DEVOL  3,306,442
MULTI-PROGRAM APPARATUS
Filed Nov. 2, 1964
3 Sheets-Sheet 1
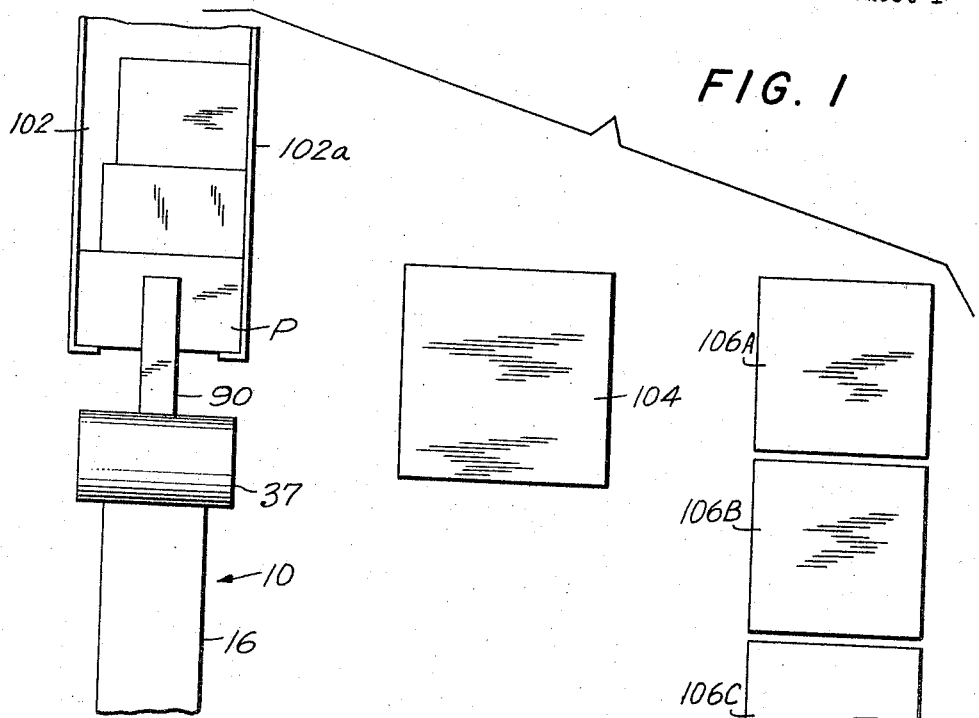
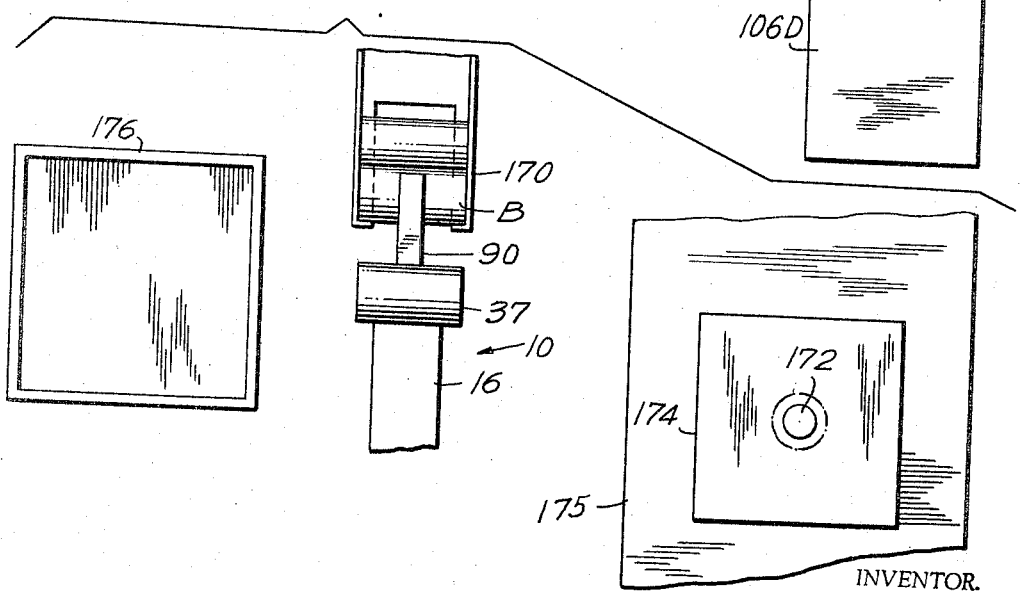
INVENTOR.
GEORGE C. DEVOL
BY
*Paul S. Martin*
ATTORNEY

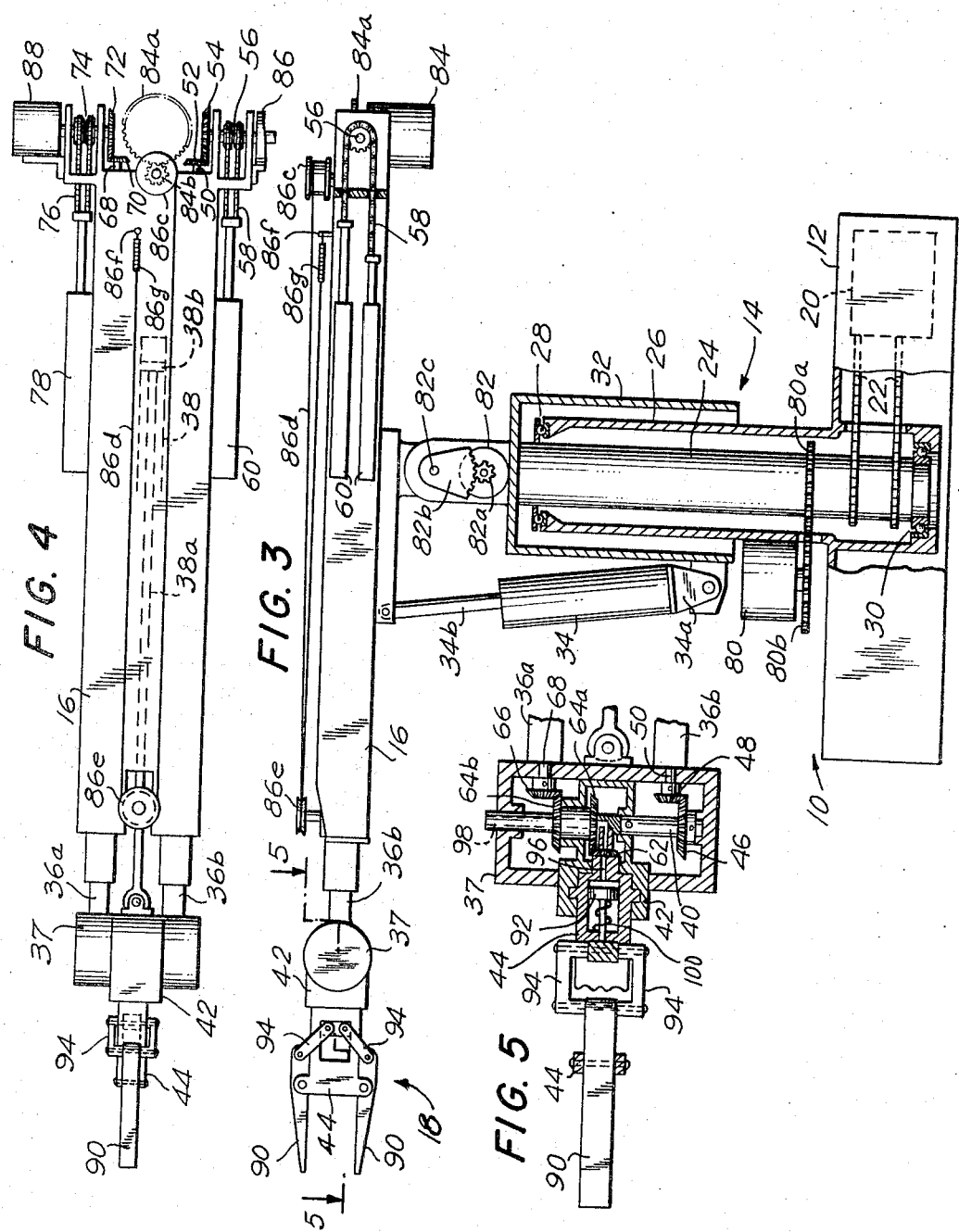

Feb. 28, 1967
G. C. DEVOL
3,306,442
MULTI-PROGRAM APPARATUS
Filed Nov. 2, 1964
3 Sheets-Sheet 3
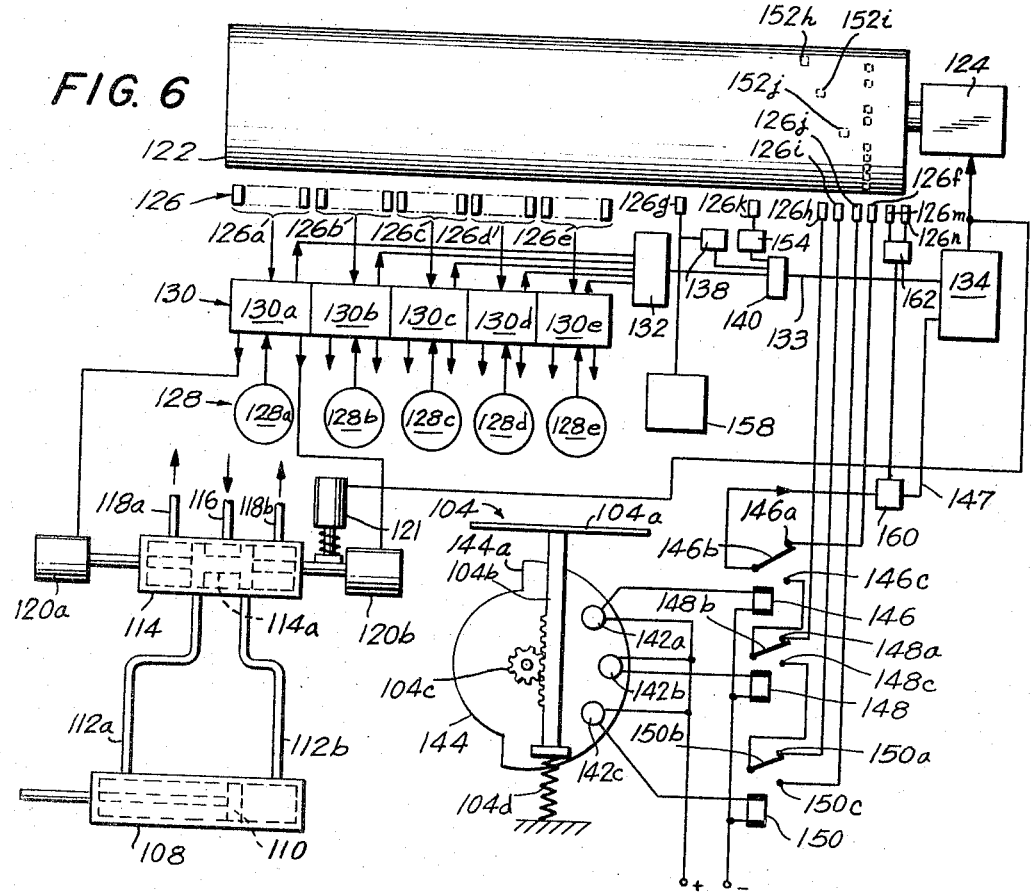
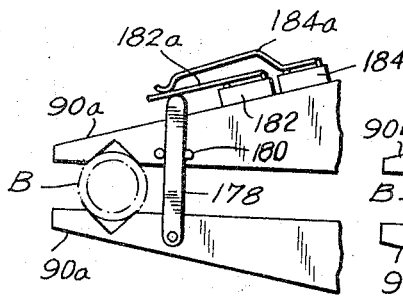
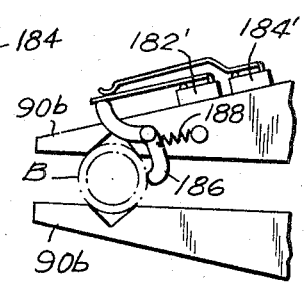
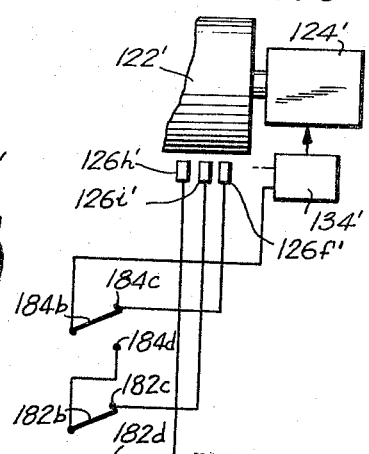
INVENTOR.
GEORGE C. DEVOL
BY
Paul S. Martin
ATTORNEY

United States Patent Office 3,306,442
Patented Feb. 28, 1967

3,306,442
MULTI-PROGRAM APPARATUS
George C. Devol, P.O. Box 1273,
Greenwich, Conn. 06830
Filed Nov. 2, 1964, Ser. No. 408,255
13 Claims. (Cl. 209—121)

The present invention relates to apparatus of the type that is controlled by what is here called recorded-program means and, particularly, to article-handling apparatus having recorded-program control means.

The term "recorded-program" control means is used here in contradistinction to cam control means. In using cams for machine control it is recognized that the number of motions in a sequence that can be executed, and the complexity of each motion, are relatively limited, and it is also recognized that when a new program of motions is to be carried out by an existing machine, a new series of cams must be designed, machined and installed, and the machine must then be adjusted with great pains before it is capable of carrying out the new sequence of operations.

Recorded-program control of various machines is disclosed, for example, in my Patents No. 2,590,091 issued March 25, 1952, and No. 2,988,237 issued June 13, 1961. The latter is concerned with record-program control of apparatus that is equipped with an article holder and is especially well suited to highly flexible duty in gripping, transferring and releasing articles. See also my pending application Ser. No. 226,203 filed Sept. 26, 1962. In my application Ser. No. 368,550 filed May 19, 1964, further improvements in such machines are disclosed; and in the latter there is a description of an article being carried from a supply point to a paint-spray apparatus; the programmed operation of the article handling unit is interrupted during the painting operation; and thereafter the article is delivered to a discharge point. These examples of programmed apparatus have the specially important capacity of being "teachable." The apparatus can be operated initially under manual control to execute a desired program of motions and, during this initial operation, the motion-control program is recorded magnetically. Thereupon, the apparatus is switched over to automatic control, for executing the "taught" sequence of motions and article-grasping and releasing operations.

The recorded program of apparatus of this type as there described is carried out invariably. There may be periodic delays introduced in the program, to allow time for the controlled article-handling apparatus to coordinate with other apparatus; and the continued operation of the controlled apparatus past a given point in the program may depend on an article being present at a particular spot. However, there is but one consistent order of operations that is executed repeatedly, with planned interruptions.

An object of the present invention resides in the provision of article handling apparatus that is program-controlled and which is capable of carrying out any of several recorded-program operations selectively in dependence on variable conditions external of the apparatus itself.

A more specific object of the invention resides in the provision of a recorded-program controlled apparatus equipped with a means for detecting various external conditions to which the apparatus is to respond differently, together with a means for bringing into effect a selected portion of the recorded program so as to achieve the intended response corresponding to each detected condition. More particularly, an object of the invention resides in equipping recorded-program apparatus with a means for recognizing physical differences among articles to be handled together with a means for bringing into effect different modes of response of the apparatus in accordance with the detected condition. Thus, the detector can be of a form appropriate to respond to various article characteristics, such as color, hardness, thickness, weight, etc., and it is also contemplated that several concurrently detected characteristics can be resolved in exercising control over the internal program control means of the apparatus. In one embodiment of the invention of particular importance, the weight of each article is detected, and the results of successive weighing operations are utilized in sorting the articles of different weight categories among different delivery places. In another embodiment of the invention described below, a dimension of the articles is detected as being either proper or outside the prescribed tolerance, and the result is used to effect either an assembly operation or, selectively, to reject any given article.

It will be apparent that, in broader aspect, the invention contemplates selective execution of various programs of motions of an article holder in three dimensions under control of pre-recorded program means, even where the external condition to which the apparatus responds may not be a characteristic of the article itself.

A still further feature of the invention relates to article-handling apparatus involving three-dimensional motion-control program means wherein a common and invariable program is executed, it is interrupted for execution of a selective motion among several recorded-program motions within the capability of the apparatus, followed by resumption of the common program.

A detailed description of an embodiment of the invention in its various aspects appears below, together with modifications. An article-handling unit is provided having article-gripping jaws controlled by a recorded program and operable through three-dimensional paths by multiple actuators that function in respective degrees of freedom. The motions are carried out under control of recorded-program means, but the executed motions are different in dependence on selective control. In one example, the selective control is determined by external means, a spring balance. In another example, the selective control is determined by a detector incorporated in the article-handling unit itself. Weight of an article is the controlling criterion in one illustrative example, while size is the controlling criterion on the other. The form of program control in the illustrative description is the preferred point-to-point type of control, in which digital codes are recorded in sequence for causing the article-holding unit to move its article holder to corresponding points in space which may be digitally represented. However, it will be understood that other recorded-program modes of control are contemplated, such as the point-to-point system of control that depends on a program of numbers for determining how many discrete steps the apparatus is to travel in going from each point in the program to the next point, as well as the system that utilizes continuous control all along the controlled paths, these classes of programmed motion controls being reviewed, for example, in my Patent No. 2,590,091 and in my application Ser. No. 368,550, mentioned above.

The nature of the invention in its various aspects as indicated above will be more fully appreciated, together with the foregoing and other objects and novel features, from the following detailed description of a presently preferred embodiment and modifications shown in the accompanying drawings.

In the drawings:

FIGURES 1 and 2 are plan views illustrating diagrammatically the performance of two embodiments of the invention;

FIGURE 3 is a side elevation of an article-handling unit utilized in FIGS. 1 and 2, drawn to reduced scale, including portions shown in cross-section;

FIGURE 4 is a plan view of the unit in FIG. 3;

FIGURE 5 is a fragmentary cross-sectional view, drawn to larger scale, of a portion of the apparatus in FIG. 3, as viewed from the section-line 5—5 therein;

FIGURE 6 is a diagrammatic illustration of the control system of the embodiment in FIG. 1;

FIGURE 7 is fragmentary view of a portion of FIGS. 3, 4 and 5 showing details thereof used in the embodiment of FIG. 2;

FIGURE 8 is a modification of the apparatus in FIG. 7; and

FIGURE 9 is a diagram showing a detail of FIG. 6 modified to utilize the apparatus of FIGS. 7 or 8.

Referring first to FIGS. 3, 4 and 5, an article-handling unit 10 is shown having a pedestal 12, a post assembly 14, an arm 16 and an article holder 18.

Pedestal 12 encloses a drive unit 20 having a dual sprocket-and-chain connection to rotatable shaft 24. Fixed cylinder 26 on pedestal 12 carries an upper bearing 28 for shaft 24, and lower rotary thrust bearing 30 for shaft 24 is also provided in pedestal 12.

Arm 16 has a horizontal pivotal axis defined by suitable bearing detail (not shown) at shaft 82c at the top of shaft 24. A cylindrical guard shell 32 surrounding cylinder 26 is fixed to shaft 24. Near the bottom of this guard shell there is secured one part 34a of hydraulic actuator 34, while the extensible shaft 34b of actuator 34 is secured to arm 16 for effecting vertical motion of arm 16 about its bearing aligned with the axis of shaft 82c.

A pair of tubular shafts 36a and 36b are telescopically received in bores in arm 16. Shafts 36a and 36b carry head 37 of the article holder 18 and accommodate radially outward and inward movement to project and retract article holder 18. Hydraulic actuator 38 in arm 16 includes a rod 38a and a piston 38b, rod 38a being connected to head 37 to drive head 37 radially outward and inward, depending on admission of hydraulic fluid to one side or the other of piston 38b, as is customary in the use of reciprocating hydraulic actuators.

Suitable bearings in head 37 support shaft 40. A wrist-motion part 42 of article holder 18 is fixed to shaft 40. A twist-motion part 44 is rotatable about an axis along arm 16 in a bearing (as illustrated) in wrist-motion part 42.

For effecting wrist-motion actuation, a driven bevel gear 46 is fixed to shaft 40 and a driving bevel gear 48 meshes with gear 46. Splined shafts 50, 50' couple gear 48 to another bevel gear 52 (at the right in FIG. 4). Driving bevel gear 54 meshes with bevel gear 52, and the former is itself driven by a dual sprocket-and-chain connection 56, 58 to two-part hydraulic actuator 60. Chains 58 are pulled at one end or the other by two-part actuator 60. As will be apparent, hydraulic actuator 60 turns shaft 50, which causes shaft 40 to turn and thus causes wrist-motion of head 37 about the axis of shaft 40.

For the purpose of operating twist-motion part 44 about an axis along arm 16, a bevel gear 62 is fixed to part 44 and is driven by double bevel gear unit 64a, 64b that is rotatable on shaft 40 and constrained against axial shift by a bearing, as shown, formed in wrist-motion part 42. Bevel gear 66 at one end of shaft 68 meshes with gear 64b. Splined shafts 68, 68' are driven by bevel gears 70 and 72, a sprocket-and-chain drive connection 74, 76, and another two-part hydraulic actuator 78 like actuator 60. Through the transmission described, actuator 78 rotates bevel gear 62 in head unit 37 and thus twists part 44 about its axis along arm 16.

From the foregoing, there are seen to be five motions carried out by the apparatus in five degrees of freedom, effected respectively by actuators 20, 34, 38, 60 and 78, respectively. The position of each driven part is represented by so-called analog-to-digital encoders or shaft-position encoders. Thus, for indicating the rotary position of shaft 24, gears 80a and 80b couple encoder 80 to shaft 24. For each significant, discrete position of shaft 24, encoder 80 produces a distinctive, unique code which is a numerical representation of that position in its total range of motion. Likewise arm-positioning encoder 82 is coupled by gear 82a and drive sector 82b to shaft 82c that is fixed to arm 16. Encoder 84 for indicating the radial position of head 37 is coupled via gears 84a, 84b, to an internally spring-tensioned drum 86c about which is wound a cable 86d. The latter extends about an idler 86e fixed to rod 38a, and to a pin 86f, via tensioning spring 86g. Encoders 86 and 88 likewise provide digital codes representing, respectively, the wrist position of part 42 and the twist position of part 44.

Head 37 carries a pair of jaws 90 for seizing and releasing an article. Jaws 90 are pivoted on pins in twist part 44. A piston 92 in a cylindrical bore in part 44 is connected by pairs of links 94 to jaws 90. Fluid under pressure is admitted to the right of piston 92 as shown in FIG. 5 via bores 96 and 98, from a suitably controlled source of pressure. Jaws 90 are normally biased open by suitable spring means, such as compression spring 100 at the left of piston 92. The paws are closed by controlled air or liquid under pressure supplied to bore 98.

The article handling unit 10 thus far described is a known unit that is well suited to the purposes of the present invention. That unit is shown and described in my copending application Serial No. 368,550 where it is shown that the actuators for producing motions in the five degrees of freedom are operable under digital-code control, or under other forms of program control such as a continuous-path contour trace on a magnetic record, and other programmed controls are also mentioned there. Notably, such program controls are recorded (as described in my application Ser. No. 368,550) in an initial manually controlled sequence of operations. Subsequently the operations are repeated automatically under control of the recorded-program controls. Such a machine is said to be "teachable," for carrying out new motions as required from time to time.

The presently preferred form of recorded-program control for the above-described motion actuators is described below, but it will be appreciated that other types of recorded program control are within present contemplation. See also the forms of control shown and claimed in my Patent No. 2,988,237 and my application Ser. No. 226,203.

The article-handling unit as thus far described is capable of seizing and releasing articles and of carrying the article holder through motions determined by program recordings. The flexibility of this apparatus is here greatly extended by rendering it differently responsive to various conditions in its environment. FIGURES 1 and 2 illustrate systems including two different condition-responsive controls that are effective to impose control over the article-handling unit to execute different pre-recorded programmed operations as determined by externally determined conditions.

In FIG. 1, article-handling unit 10 is represented by arm 16 and jaws 90 in position to grip a part P resting in a chute 102. The bottom of the chute is here slanted sidewise so that the articles or parts P bear against side wall 102a of the chute. By programmed control, unit 10 grips an article P, lifts the article out of the chute, twists the article through about 90° so that the right-hand face of the article in the chute is exposed downward. Then the article is transferred to the platform 104a of a spring scale 104. The jaws release the article which is then weighed. Up to this point there is a pre-recorded program in control that is common to articles of all different weights.

The weight of the part P is next used to select the subsequent program-controlled article-handling motions of unit 10. The article is gripped once again by jaws 90, and it is lifted and transported to a particular one of four different receiving bins 106A, 106B, 106C and 106D, as controlled by the scale reading. The common part of the recorded program cycle is resumed. The jaws are opened to release the articles, and then the empty jaws are transported through any desired sequence of motions to the pick-up position at chute 102.

FIG. 6 illustrates the control apparatus that determines the operation of unit 10 (FIGS. 3–5) in carrying out the operations described in connection with FIG. 1.

A typical actuator of unit 10 is represented in FIG. 6 by hydraulic actuator 108 having a piston 110. Hydraulic fluid under pressure is selectively supplied to one side of piston 110 via one of the lines 112a and 112b and fluid from the other side of piston 110 is discharged via the other line, under control of master valve 114 in producing mechanical drive output. When the actuator is to remain fixed in place, master valve 114 traps the fluid at both sides of the piston. Line 116 delivers hydraulic fluid under pressure to valve 114 from a suitable fluid pressure supply (not shown) while lines 118a and 118b deliver low-pressure fluid from the valve to a sump. Two solenoid actuators 120a and 120b shift valve spool 114a to one side of center or the other, in operating actuator 108; and when neither solenoid is energized, spool 114a is centered by means of springs internal to solenoids 120a and 120b. Further, a brake solenoid 121 is provided for locking spool 114a in its centered position when actuator 108 is to remain fixed in any position to which it was operated even though one of the solenoids 120 may be energized.

The following means is provided for operating a selected solenoid 120a or 120b, and for terminating such operation, to cause program-controlled operation of actuator 108.

A magnetic-surfaced drum 122 is rotatably supported by suitable means (not shown) and equipped with a rotary drive unit 124 for controllably rotating drum 122 through any desired arc. A row of sensing elements 126 is disposed opposite drum 122, including five groups of elements 126a, 126b, 126c, 126d and 126e. Drum 122 has control areas arranged in tracks and slots, a track being a circular series of areas opposite any one sensing element 126 and a slot being all those sensing areas opposite all the sensing elements 126 in any one position of the drum. Elements 126 are of the at-rest sensing type that are responsive to the magnetic field and do not depend upon relative movement between the drum and the sensing element to induce an output signal. Such sensing elements are disclosed in my above-mentioned patents and patent applications.

Group of elements 126a sensees the code combination of magnetized or unmagnetized areas (or areas of opposite magnetic polarity) in a slot on drum 122. This code combination represents the position to which a typical actuator is to operate its part of unit 10. The code corresponds to one unique code combination of the analogue-to-digital converter of unit 10 coupled to such actuator.

Analogue-to-digital converters 128 are included in FIG. 6, separately designated 128a, 128b, 128c, 128d and 128e corresponding to such converters 80, 82, 84, 86 and 88 of FIG. 3. Converters 128 supply code input to comparison devices 130, and sensing elements 126 also supply code input to such comparison devices. These comparison devices may take any desired form. They are here assumed to be of a form that indicates the numerical difference and its sign (plus or minus) between the codes of encoders 128 representing the actual position of an actuator, and the codes of the groups of sensing elements 126 which represent the positions to which the actuators are to operate. The internal detail of such a comparison circuit is shown, for example, in my above-mentioned application Serial No. 368,550. Depending on the sign of the difference or error signal, one of the other of the solenoids 120 is energized. That solenoid remains energized until the error signal disappears, whereupon spool 114a is centered and actuator 108 is arrested. Another form of comparison detector is shown in my Patent No. 2,988,237 which is capable of indicating match or mismatch of the codes without giving its sign; and in that case the solenoid 120 to be energized is controlled by a direction-of-drive sensing head 126 and track on drum 122. In any case, when devices 130 indicate a match between the codes, spool 114a is centered and actuator 108 stops.

Each of the code comparison units 130 as shown has connections to solenoids 120 to control a corresponding valve 114 and actuator 108. One of the solenoids 120 is energized so long as "mismatch" exists. When match is attained in all five units 130, then this condition is detected by coincidence detector 132 and (subject to further conditions to be described) coincidence gate 132 triggers a bistable drum-drive control unit 134 into condition to cause advancing operation of drum drive unit 124. At the same time, spool 114a is centered, and brake solenoid 121 is controlled by unit 134 to arrest valve 114 in its centered condition. It is assumed that brake 121 is faster acting than the drum-advance drive, and that valve 114 is locked before the just-sensed slot advances away from sensing elements 126.

Thus, after coincidence gate 132 indicates that all the actuators of unit 10 have reached the position called for by the codes of drum 122 opposite heads 126, the drum starts to advance. Even though the codes sensed by elements 126 have changed due to the advance of drum 122, valve 114 in held in place to fix all the actuators of unit 10 in the positions called for by the previously sensed codes.

A sensing head 126f opposite a drum-advance control track provides output for arresting drum 122 at the next slot of the drum after drum advance has been initiated. When the drum has advanced one slot, output of head 126f impresses a stop impulse on unit 134, reversing the bistable condition of the latter. Consequently drum 122 normally stops with the next slot opposite heads 126, and brake 121 is released. Valves 114 for each of the hydraulic actuators can then be operated as may be required by the position codes newly presented to groups of sensing elements 126a, 126b, 126c, 126d and 126e in comparison to the codes emitted by encoders 128. In this manner head 37 of unit 10 can be moved, point-to-point, through any desired sequence of motions in three dimensions, to carry out each of the motions needed in the operations of the system of FIG. 1.

After head 37 has been positioned properly for operation of jaws 90 to engage or release an article, the drum advances, as already described. The next slot contains a jaw-control spot opposite sensing element 126g. The output of sensing element 126g is applied to a circuit 158 which is bistable and is of a form that reverses its state in response to each new input pulse. This bistable circuit is connected to a suitable valve for applying pressure to jaw-actuating piston 92 or to interrupt jaw-closing pressure.

In the slot containing the jaw-operating control spot, the same position codes are again presented to the code-sensing groups of elements 126 as in the preceding slot. Brake 121 is released; but because comparison devices 130 are all satisfied, coincidence detector 132 promptly provides a drum-advance signal. In order to insure a time interval for jaw operation, a short time delay may be injected by a monostable delay unit 138 under control of sensing element 126g. This delay unit 138 controls a coincidence gate 140. A signal from coincidence gate 140 is passed to drum-advance unit 134 only after the delay time of unit 138 has elapsed and unit 138 lapses into its normal state. This may be short, only long enough for jaws 90 to grasp an article before the next operation of the motion actuators. Delay unit 138 can be omitted where the time of advance of drum 122 is sufficient for jaw operation.

In connection with FIG. 1, it will be recalled that at one point in the sequence of operations an article is deposited on scale 104. This spring scale is illustrated in FIG. 6 as having a series of photoelectric cells 142 normally blocked from a source of light (not shown) by a mask 144. The scale has a platform-supporting rod 104b that carries rack teeth in mesh with gear 104c. Platform 104a and rod 104b are depressed to an extent that depends on a balance between the weight of the deposited article and the reverse-acting force of spring 104d. Gear 104c is fixed to mask 144, and as the platform is depressed progressively farther, edge 144a of mask 144 passes photocells 142 successively and exposes those photocells to light.

Each photocell 142 is connected to a corresponding relay 146, 148 and 150. Each relay remains energized so long as its photocell is exposed to light. Relay 146 has a first contact pair 146a, 146b that is normally closed. This contact pair is interposed in the connection between sensing head 126f and unit 134.

Relay 148 has a normally closed contact pair 148a, 148b connected to contact 146c and to sensing element 126h. Relay 150 has a normally closed contact pair 150a, 150b connected to sensing head 126i and to contact 148c. Relay contact 150c is connected to sensing element 126j.

So long as the scale has no weight on its platform, drum advance occurs as already described and is terminated the next time sensing element 126f detects a magnetized area, and that occurs in the next slot of the drum. The same action occurs when a weight of lowest weight classification is placed on the scale.

In case an article is placed on the scale of sufficient weight to move mask edge 144a past photocell 142a, relay 146 is energized, contacts 146a, 146b open, and sensing head 126f is disconnected. Contacts 146b, 146c close to provide a control connection from sensing element 126h via contacts 148a, 148b and contacts 146b, 146c to unit 134. Finally, when all the photocells are exposed, relays 146, 148 and 150 provide a switching connection from sensing element 126j to unit 134.

When an article is placed on scale 104 of sufficient weight to cause photocell 142a to energize relay 146, sensing element 126h is substituted for sensing element 126f as the control element that terminates advance of the drum. Sensing element 126i becomes effective to arrest drum advance when a still heavier article is on the scale, and sensing element 126j similarly becomes effective to control drum advance when all three photocells are exposed.

Magnetized control areas 152h, 152i and 152j are in different tracks sensed by elements 126h, 126i and 126j respectively. These areas are spaced apart about the drum successively, and each is spaced from the next by more than the one-slot arcuate spacing of the control areas sensed by element 126f so as to provide multiple slots for each of the selective programs, which may also be called "special" programs. Each control area 152h, 152i and 152j is in the initial slot of a respective special program.

After one of the sensing elements 126h, 126i or 126j becomes effective because of energization of one or more of the relays 146, 148 and 150, the drum advances past many slots, and the drum is arrested when the first slot of the selected "special" program arrives under the selected sensing element 126h, 126i or 126j.

The first step of the selected program is automatically executed. This involves immediately closing the jaws 90 on the article on the scale and lifting the article clear of the scale. When this occurs, relay contacts 146a, 146b close, and restore sensing element 126f into effect for stopping the drum repeatedly after each one-slot advance.

Sensing element 126k opposite drum 122 has a monostable delay circuit 154 that is connected to coincidenc gate 140. A control area is recorded in each slot that contains a jaw-release recording for the position of unit 10 in which an article is deposited on scale 104. So long as circuit 154 is in its unstable state, gate 140 is blocked. This allows time for the spring balance 104 to come to rest after an article has been deposited on scale platform 104a, before drum advance is permitted. The article then remains on the balance while the drum advances sufficiently for the sensing of elements 126h, 126i or 126j (as selected by the balance) to cause a stop impulse to reach unit 134.

From the foregoing, it is seen that a short "special" program of the drum is selected by the apparatus identified with the spring balance. After the drum has placed the first slot of that selected "special" program in effect, the further operations of the apparatus to control the jaws 90 and the actuators of unit 10 continue as in the case of sensed slots in effect during execution of the "common" program. When the balance 104 becomes effective, the selected special program is brought into sensing relation to elements 126 by virtue of the advance of the drum through many slots, until the initial slot of the selected "special" program is sensed by element 126h, 126i or 126j.

In the example of FIG. 1, the "special" programs cause jaws 90 to seize the article on platform 104a, and then to transport that article through a path that may require a few control slots in drum 122, to one of the discharge points 106A, 106B, 106C or 106D. During this programmed sequence of steps, contacts 146a, 146b are again closed since the article has been lifted from the spring balance, and sensing element 126f controls the stepwise drum advance.

If it should be desired to carry out the operations of gripping an article on the scale and then lifting it clear of the scale in two successive steps under control of successive slots of the drum (rather than using but one slot as described immediately above) this can be done simply by providing a magnetized drum-advance control area 152h, 152i and 152j in each of two successive slots of the drum at the start of each "special" program and, in the remainder of such slots, providing appropriate magnetized jaw control areas in the first slot and position codes in the second slot of each special program to effect lifting of an article away from the scale. At the end of these operations, as before, the subsequent control of advance of the drum is restored to sensing element 126f due to the closing of contacts 146a and 146b.

At the end-point of the selected special program, the normal or common program of motions is to be resumed. The closed jaws are caused to open by renewed actuation of jaw control unit 158. Head 137 is next returned to the pick-up point at chute 102, and this motion may involve traverse of head 137 through a complex path utilizing a number of drum slots. The apparatus is then in condition to start another article-handling cycle automatically.

Means is provided to cause the drum to advance without interruption from the last slot of any selected special program to the first slot at which the common program resumes. It will be recalled that a signal on line 133 from coincidence gate 140 triggers bistable drum-advance circuit 134 into its drum-advancing condition. Conversely, an impulse on line 147 from sensing element 126f (or any sensing element 126h, 126i or 126j) reverses the condition of circuit 134 to terminate drum advance. Line 147 has a gate circuit 160 that ordinarily transmits the drum-stopping impulses from sensing element 126f, etc. A bistable circuit 162 (like circuit 134) is controlled by sensing elements 126m and 126n for at times changing the condition of gate 160 so as to be blocking.

A control magnetic spot is provided in the last slot of each special program opposite sensing element 126m that triggers bistable circuit 162 into condition to render gate 160 blocking. A control magnetic spot is also provided opposite sensing element 126n in the first slot of the common program that follows the successive special programs.

Upon completion of the last motion determined by the last slot of the selected special program, the drum starts to advance and it continues to advance due to the blocking effect of circuit 162 on gate 160 until gate 160 is no longer blocking. This occurs when sensing element 126n senses a control magnetized area in the first slot at which the common program is resumed and, consequently, circuit 162 is restored to its normal condition in which it holds gate 160 open. During the long advance of the drum, the various actuators of unit 10 are all locked due to the control of brake 121.

The sorting apparatus of FIGS. 1 and 3–6 involves a number of important features, some of which are here summarized. The sorting of the articles handled demonstrates selection of any one of a number of stored programs for control over the article-handling unit. In particular this control over selection can originate outside the article-handling unit itself. The selection can be determined by a physical characteristic of the article being handled, namely, weight. Further the apparatus is capable of following a common program for part of a sequence of motions, with a selected recorded program interposed when needed. Moreover, the patterns of motion executed by the article-handling unit are infinitely changeable, through recording of substitute programs.

FIG. 2 illustrates an improvement in apparatus such as that described in connection with FIGS. 1 and 3–6, which utilizes the feature of selection of special recorded programs for control of the article handling unit. In FIG. 2 the selection is controlled by the size of each article being handled. The articles are bushings, in the example shown, and they are to be moved from supply chute 170 to a normal delivery point or, selectively, to one or more rejection points. The delivery point is represented by an upstanding pin 172 on a block 174 carried by conveyor 175. The program that is selected in case the bushing is of the proper outside diameter produces the necessary motions to assemble the bushing to the pin. The program that is selected in case the bushing is too large or too small effects transfer of the bushing by head 37 to a "reject" tote box 176. The control programs are all as previously described in relation to FIG. 6, except that spring balance 104 is here replaced by calipering means identified with jaws 90 as illustrated in FIGS. 7, 8 and 9.

In FIG. 7, jaws 90a are modified (as compared with jaws 90 of FIGS. 3–5) to include V-notch portions as illustrated for gripping a bushing B. A rod 178 pivoted to the lower jaw is guided by pins 180 in the upper jaw. A pair of switches 182 and 184 secured to upper jaw 90a have arms 182a and 184a that are spring-biased toward the upper end of rod 178. The spring bias operates both switches when rod 178 is removed, and both switches are operated reversely when rod 178 lifts both arms 182a and 184a. The switch arms are so adjusted that, for a bushing of proper diameter, one switch is in the arm-depressed condition and the other is in its arm-lifted condition. Precisely constructed and mounted switches can be used for rejecting bushings of wrong size, which may occasionally find their way to chute 170. With proper design, bushings outside of a specified dimensional tolerance can also be distinguished from proper bushings.

As seen in FIG. 9, contacts 182b, 182c of switch 182 are normally closed as are contacts 184b and 184c of switch 184 when rod 178 is retracted and the jaws are open. When the contacts are in the positions illustrated in FIG. 9, a bushing in jaws 90a is over-size, and it is under-size when both switches 182b and 184b are reversed. In both cases the control apparatus is here programmed to reject out-size bushings through the utilization of a special program on drum 122' selected by one of the sensing element 126f' or 126h'. Such out-size bushings are discharged into tote box 176 (FIG. 2).

The third switch combination (only switch 184b operated out of the position shown) causes delivery and assembly of the bushing to pin 172, in accordance with the respective recorded programs.

In the example given, the same program is carried out whether sensing element 126f' or 126h' is in effect when the bushings are gripped. Evidently different special programs can be recorded for sorting undersized bushings from those that are over-size, requiring only the appropriate recordings.

In FIG. 7, the jaws 90a serve not only to grip a bushing but also as the gauging parts. This need not be the case. In FIG. 8, a pivoted calipering member 186 pivoted to upper jaw 90b controls switches 182' and 184'. Member 186 is biased by spring 188 to bear against bushing B retained in notched jaws 90b. Such an arrangement can be proportioned to achieve a high order of precision and sensitivity.

The selective control over the special recorded program that is rendered effective in the manner illustrated in FIGS. 7–9 is the result of a calipering or gauging operation, and this is executed by means carried by the article holder itself rather than by apparatus external to the article handling unit as in FIGS. 1 and 3–6. Still further applications of the flexibility of selectivity in the use of such recorded-program apparatus will be readily apparent. In this connection, it should be observed that the type of program control here involved is readily changed through recording of new programs, as described in my patents and applications mentioned above. The illustration of elements for recording new programs and the description of the manner in which new programs can be recorded as needed are omitted here solely in the interest of brevity. That omission should not be taken as a reflection on the importance of programs of a type that may be recorded readily in achieving the purposes of the present invention.

The selective programs in the embodiment of FIG. 6 are all sensed by one complement of sensing elements. This is an economical arrangement, considering that a practical example of such apparatus may include 12 or more sensing elements 126 in a single actuator-control group. However, that arrangement involves some loss of time in article-handling operations while the drum indexes the desired program to the sensing elements. Multiple complements of sensing elements disposed at different areas of a drum can be employed in sensing relation to respectively different special programs, selected for the purposes described merely by switching rather than by advancing the program control drum. Still further modifications are contemplated as, for example, the substitution of other forms of program controller for the magnetic drum illustrated.

From the foregoing, it is evident that the preferred embodiment of the invention and the modifications described above in detail are susceptible of various further modifications and a latitude of varied application within the skill of the art, and therefore the invention should be construed broadly in accordance with its full spirit and scope.

What is claimed is:

1. Apparatus for selectively handling articles, including an article holder operable to seize and release articles successively, apparatus for carrying said article holder through three-dimensional movements including multiple drive mechanisms operable to actuate said carrying apparatus in respective degrees of freedom, program means for controlling said drive mechanisms and said article holder to effect predetermined correlated three-dimensional movements of the article holder by said carrying apparatus and, in coordination therewith, to cause said article holder to seize and release an article, said program means including a plurality of motion-control program recordings, sensing means therefor and control means responsive to said sensing means for determining the operation of said drive mechanisms, means for sensing a physical characteristic of an article on which the article handling apparatus operates, and means controlled by said characteristic sensing means for selectively rendering a particular portion of said motion control program recordings effective to cause the article holder to move through a path corresponding to the sensed characteristic of the article.

2. Automatic apparatus for effecting selective operations in handling a succession of articles, including an article-handling unit comprising an article holder having actuating means to seize and release an article, and means for carrying said article holder through complex three-dimensionl paths, said article-holder carrying means including a plurality of actuators operable in coordination for effecting operation of said article-holder carrying means in a corresponding plurality of degrees of freedom and program control means for said actuators, said last-named means comprising a plurality of recorded programs and sensing means therefor, each of said recorded programs having portions corresponding to said actuators, respectively, to effect a program of coordinated motions of said actuators, means for sensing a controlling characteristic of a succession of articles, and means controlled by said charcteristic sensing means for rendering a selected one of said recorded programs effective to control said actuators, thereby to cause selective handling of an article subjected to said characteristic sensing means, and said program means including recorded control portions for causing said article-holder to seize and release articles in coordination with the program-controlled operation of said article-holder carrying means.

3. Apparatus for selectively handling articles, including an article-handling unit comprising an article holder operable to seize and release articles successively, carrying apparatus for moving said article holder through three-dimensional movements, and program means for controlling said carrying apparatus and said article holder for executing various article-handling motions and said program means including a plurality of motion-control recorded programs and sensing means therefor and control means responsive to said sensing means for controlling said article holder and said carrying apparatus, a detector cooperable with an article that is to be handled for sensing a physical characteristic thereof, and means responsive to said detector to render a selected one of said plurality of recorded programs effective to cause selective handling of an article in accordance with its detected characteristic.

4. Apparatus in accordance with claim 3 wherein said detector is carried by said article holder in position to cooperate with an article held by said article holder.

5. Apparatus in accordance with claim 3 wherein said detector is an integral part of said article holder and utilizes at least one article-engaging portion of the article holder as a part of the detector.

6. Apparatus in accordance with claim 3 wherein said detector is separate from said article handling unit, and wherein said program means includes program portions causing said article holder to cooperate with an article in sensing position relative to said detector.

7. Apparatus for effecting selective article-handling operations, including an article-handling unit and means external of said unit with which said article handling unit is to cooperate, said article-handling unit comprising an article holder operable to seize and release an article and carrying apparatus for moving the article holder through three-dimensional paths, said carrying apparatus including actuating means, control means for said actuating means, a plurality of program recordings each including related program portions for controlling the operation of said article holder and said actuating means in coordination with each other, sensing means cooperable with said program recordings and program control means for rendering different sequences of said program recordings effective at different times, said means external to said article-handling unit including condition-detecting means connected in control relation to said program control means for rendering various sequences of said program recordings effective in accordance with various conditions detected.

8. Apparatus in accordance with claim 7 wherein said sequences of said program recordings are successively cooperable with said sensing means, said program control means being operable under control of said detecting means to advance a selected sequence of said program recordings into sensing position, and means coordinated therewith to prevent response of said article-handling unit to portions of the program recordings that are incidentally advanced past sensing position prior to the selected sequence.

9. Automatic apparatus for moving an object through three-dimensional paths including a holder for said object, multiple mechanisms including respective actuators for moving said holder in corresponding degrees of freedom, program means for controlling said mechanisms, and condition responsive means for rendering a selected part of said program means effective, said program means including a plurality of recorded programs on a common program record, sensing means adjacent to said record, and means effective to advance said program record relative to said sensing means, selective means controlled by said condition sensing means for effecting advance of the program record to present a selected one of said record programs to said sensing means without interruption when other portions of the program record are incidentally advanced past the sensing means, and means controlled by said program means for suppressing motion of said holder from the position last occupied until the arrival of the selected recorded program into control position.

10. Automatic apparatus for moving an object through three-dimensional paths including a holder for said object, multiple mechanisms including respective actuators for moving said holder in corresponding degrees of freedom, program means for controlling said mechanisms to effect controlled motions of said object holder and for controlling the object holder to engage and release an object, said program means including a common program recording and plural special program recordings, and means variously responsive to different conditions external to the apparatus for rendering a selected one of said special program recordings effective for controlling said mechanisms, and sequencing means for rendering successively effective said common program recording and said selected special program recording for controlling said mechanisms.

11. Apparatus for selectively handling articles, including an article holder operable to seize and release articles successively, apparatus for carrying said article holder through three-dimensional movements including multiple drive mechanisms operable to actuate said carrying apparatus in respective degrees of freedom, program means for controlling said drive mechanisms and said article holder to effect predetermined correlated three-dimensional movements of the article holder by said carrying apparatus and, in coordination therewith, to cause said article holder to seize and release an article, said program means including a main stored program portion for determining a sequence of motions of said article holder and plural special stored program portions for determining, as to each special stored program portion, at least one controlled motion of the article holder, means for sensing a physical characteristic of an article on which the article handling apparatus operates, and means controlled by said characteristic sensing means for selectively rendering a particular one of said special stored program portions effective to cause the article holder to move through a path corresponding to the sensed characteristic of the article.

12. Apparatus for selectively handling articles, including an article-handling unit comprising an article holder operable to seize and release articles successively, carrying apparatus for moving said article holder through three-dimensional movements, and program means for controlling said article holder to seize and release articles and said program means including a plurality of stored programs for controlling said carrying apparatus to effect various prescribed three-dimensional movements of said article holder, a detector cooperable with an article that is to be handled for sensing a physical characteristic thereof, and means responsive to said detector to render a selected one of said plurality of stored programs effective to cause selective handling of an article in accordance with its detected characteristic.

13. Automatic apparatus for moving an object through three-dimensional paths including a holder for said object, multiple mechanisms including respective actuators for moving said holder in corresponding degrees of freedom, program means for controlling said mechanisms to effect controlled motions of said object holder and for controlling the object holder to engage and release an object, said program means including a common program storage portion having entries for determining a sequence of prescribed motions of said object holder and plural special program storage portions for determining, as to each special program storage portion, at least one prescribed motion of said article holder, means responsive to criteria external to said apparatus for rendering a selected one of said special program storage portions effective, and sequencing means for rendering effective successively said common program storage portion and that one of said special program storage portions which is selected by said external-criteria responsive means for controlling the motions of said object holder.

References Cited by the Examiner

UNITED STATES PATENTS

| | | | |
|---|---|---|---|
| 2,897,638 | 8/1959 | Maker | 209—121 X |
| 2,988,237 | 6/1961 | Devol | 214—11 |
| 3,007,097 | 10/1961 | Shelley | 214—1 X |
| 3,015,702 | 1/1962 | Vogel | 179—100.2 |
| 3,042,128 | 7/1962 | Bell | 177—210 |
| 3,101,435 | 8/1963 | Welch | 318—162 |
| 3,138,048 | 6/1964 | Warren. | |
| 3,161,729 | 12/1964 | McCarty | 179—100.2 |
| 3,228,537 | 1/1966 | Thumim | 214—1.6 |

FOREIGN PATENTS 595,871   3/1934   Germany.

MARVIN A. CHAMPION, *Primary Examiner.*